(12) United States Patent
Takayama et al.

(10) Patent No.: US 8,662,799 B2
(45) Date of Patent: Mar. 4, 2014

(54) TAPPING MACHINE

(75) Inventors: Kenichi Takayama, Minamitsuru-gun (JP); Tadashi Okita, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 62 days.

(21) Appl. No.: 13/537,648

(22) Filed: Jun. 29, 2012

(65) Prior Publication Data

US 2013/0039707 A1 Feb. 14, 2013

(30) Foreign Application Priority Data

Aug. 8, 2011 (JP) .................................. 2011-172711

(51) Int. Cl.
*B23G 1/18* (2006.01)
(52) U.S. Cl.
USPC ................. 408/9; 408/11; 700/173; 700/188; 318/39; 318/571
(58) Field of Classification Search
USPC ........... 408/8–14; 700/173, 188; 318/39, 571; 470/198
IPC .......................................................... B23G 1/18
See application file for complete search history.

(56) References Cited

U.S. PATENT DOCUMENTS

| | | | | |
|---|---|---|---|---|
| 3,571,834 A * | 3/1971 | Mathias | ............................ | 408/9 |
| 4,692,071 A * | 9/1987 | Hirota | ................................ | 408/9 |
| 4,789,943 A * | 12/1988 | Yamanaka et al. | ............ | 700/186 |
| 4,879,660 A * | 11/1989 | Asakura et al. | ............... | 700/173 |
| 5,010,286 A * | 4/1991 | Nakamura et al. | ............ | 318/571 |
| 5,093,972 A * | 3/1992 | Kaku et al. | ..................... | 29/27 C |
| 5,165,828 A * | 11/1992 | Green et al. | .................. | 408/129 |
| 5,237,251 A * | 8/1993 | Kono et al. | .................... | 318/571 |
| 5,307,549 A * | 5/1994 | Tsutsumi et al. | ............. | 29/27 C |
| 5,654,894 A * | 8/1997 | Tsutsui | ........................ | 700/188 |
| 5,857,814 A * | 1/1999 | Jang | ................................. | 408/6 |
| 6,111,382 A * | 8/2000 | Tsutsui | ........................ | 318/571 |
| 7,597,512 B2 * | 10/2009 | Kouno et al. | ................... | 408/11 |
| 2007/0007926 A1 | 1/2007 | Iwashita et al. | | |

FOREIGN PATENT DOCUMENTS

| | | |
|---|---|---|
| JP | 63245325 A | 10/1988 |
| JP | 3-43012 | 1/1991 |
| JP | 2629729 | 7/1997 |
| JP | 3097181 | 10/2000 |
| JP | 2003-181722 | 7/2003 |
| JP | 2007-42068 A | 2/2007 |
| JP | 2007-102818 | 4/2007 |

* cited by examiner

*Primary Examiner* — Eric A Gates
(74) *Attorney, Agent, or Firm* — Drinker Biddle & Reath LLP

(57) ABSTRACT

A tapping machine (1) executes a tapping operation by operating a spindle motor (21) and a feed axis motor (31) in synchronization, and includes a spindle reversal detector unit (34) for detecting the reversed operation of the spindle during the tapping operation, and a reverse correction amount production unit (35) for producing a reverse correction amount for improving follow-up performance of reversed operation of the feed axis at the time when the reversed operation of the spindle is detected by the spindle reversal detector unit (34). When the reversed operation is detected by the spindle reversal detector unit, the reverse correction amount produced by the reverse correction amount production unit (35) is added to the speed instruction on a speed control loop of the feed axis control unit (30) or to an integrator (41) of the speed control loop.

8 Claims, 9 Drawing Sheets

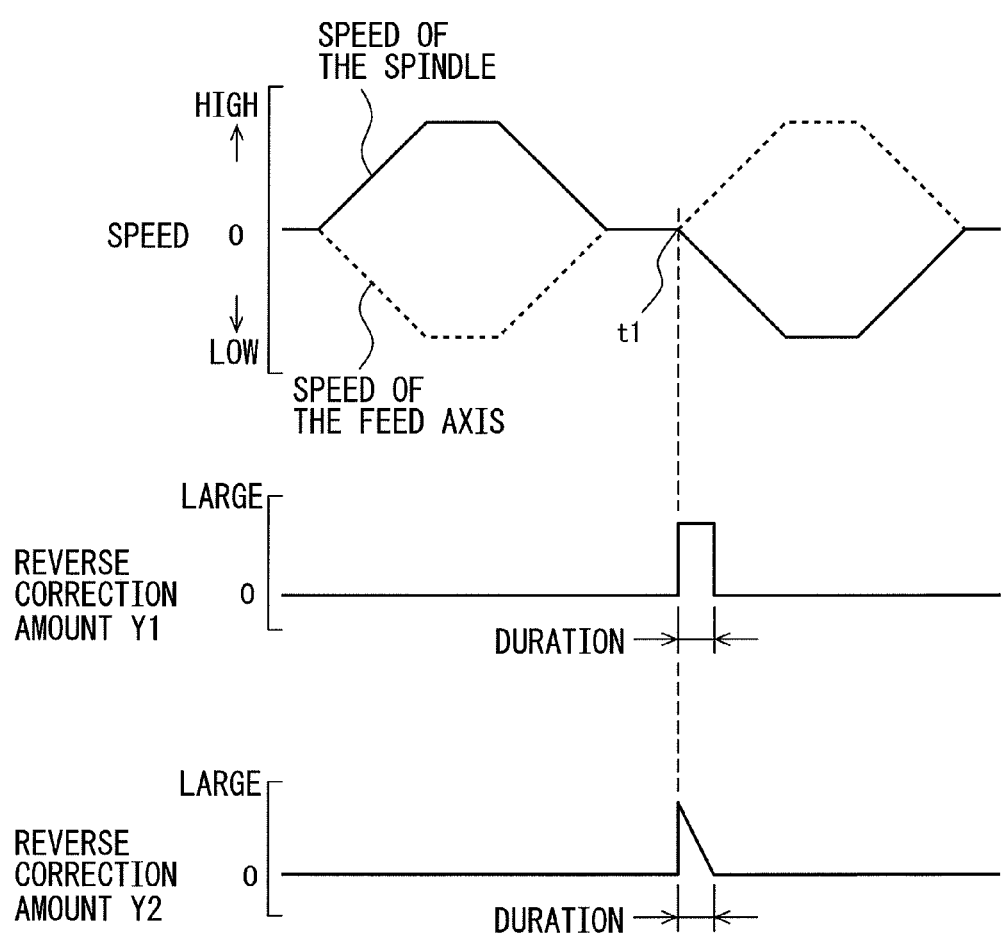

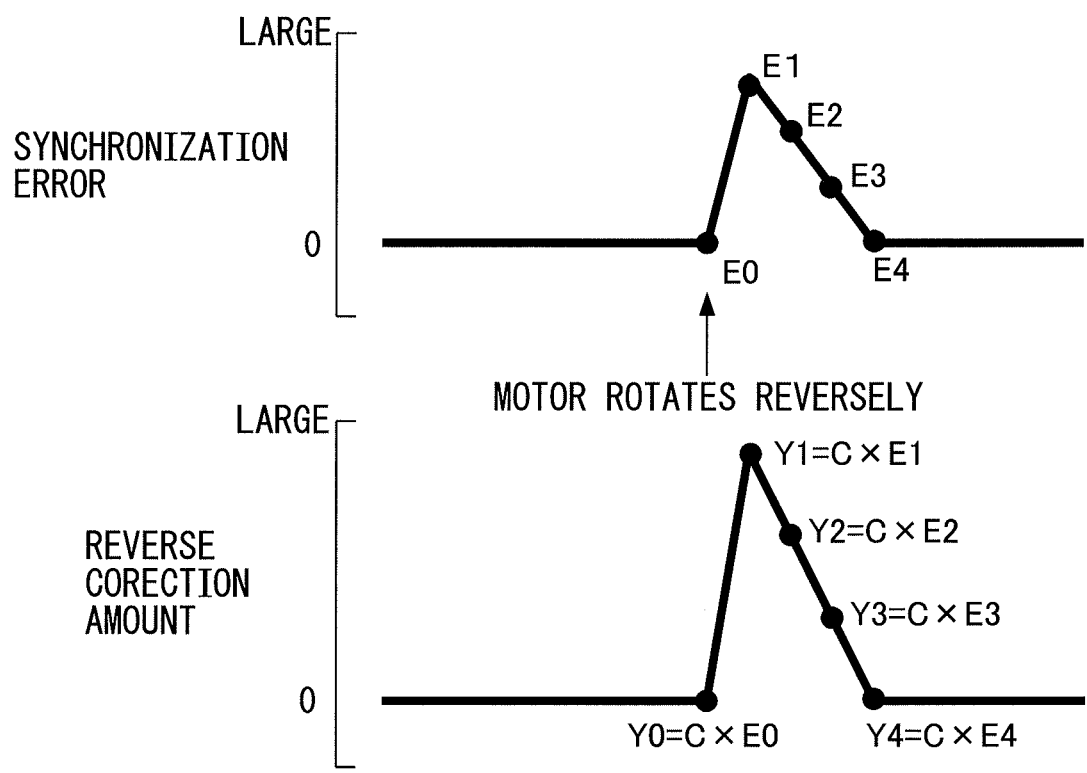

TAPPING MACHINE

RELATED APPLICATION DATA

This application claims priority under 35 U.S.C. §119 and/or §365 to Japanese Application No. 2011-172711 filed Aug. 8, 2011, the entire contents of which are incorporated herein by reference.

BACKGROUND OF THE INVENTION

1. Field of the Invention

This invention relates to a tapping machine which executes a tapping operation by operating a spindle motor and a feed axis motor in synchronization.

2. Description of the Related Art

Generally, a tapping machine, includes a tapping tool and a spindle head that is equipped with the tapping tool and moves up and down. The tapping tool rotates about a spindle being driven by a spindle motor. As a feed axis is driven by a feed axis motor, the spindle head moves up and down along the feed axis.

Japanese Registered Patent No. 2629729 discloses a feed axis that moves following a spindle, and a feed axis instruction and a correction value are produced based on the position of the spindle and the pitch of a screw. Japanese Examined Patent Publication No. 3-43012 discloses a system which executes tapping through an interpolation circuit (in synchronization with an instruction). Further, Japanese Unexamined Patent Publication No. 2003-181722 discloses a synchronization error that is stored, and the position instruction data is corrected by using the stored synchronization error.

Japanese Registered Patent No. 3097181 discloses calculating feed accelerations and total acceleration from the rotational position of the spindle, feed deviation thereof and from the feed deviation of the feed axis motor, produces a rotation instruction value based thereupon and upon the pitch of the screw, produces a rotation correction value from the feed position based on the pitch of the screw, and drives a spindle motor based on the rotation instruction value corrected by the rotation correction value.

However, in the case that the tapping operation of the system in which the feed axis follows the spindle, precision in the synchronization varies depending upon the response of the feed axis. There is no problem if the gain of the feed axis can be set to be very large. However, there are some cases in which it is not often allowed to set the gain of the feed axis to be so large. In such a case, response of the feed axis delays at the time when the spindle rotates reverse and, as a result, synchronization error increases. Further, none of the Japanese Registered Patent No. 2629729, Japanese Examined Patent Publication No. 3-43012, Japanese Unexamined Patent Publication No. 2003-181722 or Japanese Registered Patent No. 3097181 discloses about decreasing the synchronization error when the spindle is reversely rotated.

The present invention was accomplished in view of the above circumstances, and has an object of providing a tapping machine that is capable of decreasing a synchronization error between the spindle and the feed axis even when it is not allowed to set the gain of the feed axis to be so large.

SUMMARY OF THE INVENTION

In order to achieve the above object according to a first embodiment, there is provided a tapping machine comprising a spindle motor for rotating a tapping tool about a spindle; a rotational angle detector unit for detecting the rotational angle of the spindle motor or the spindle; a feed axis motor for driving a feed axis to which the tapping tool is attached; a position detector unit for detecting the position of the feed axis motor or the feed axis; a move instruction value production unit for producing a move instruction value for the spindle motor; a spindle control unit for driving the spindle motor based on a position deviation between the move instruction value produced by the move instruction value production unit and the rotational angle detected by the rotational angle detector unit; a feed axis synchronization instruction value production unit for. producing a move instruction value for the feed axis based on the detected rotational angle and a screw pitch of the tapping tool; and a feed axis control unit for driving the feed axis motor based on a position deviation between the move instruction value produced by the feed axis synchronization instruction value production unit and the position value detected by the position detector unit, to thereby execute the tapping operation by operating the spindle motor and the feed axis motor in synchronization, the tapping machine, further, comprising a spindle reversal detector unit for detecting the reversed operation of the spindle during the tapping operation; and a reverse correction amount production unit for producing a reverse correction amount for improving follow-up performance of reversed operation of the feed axis at the time when the reversed operation of the spindle is detected by the spindle reversal detector unit; wherein when the reversed operation is detected by the spindle reversal detector unit, the reverse correction amount produced by the reverse correction amount production unit is added to the speed instruction on a speed control loop of the feed axis control unit or to an integrator of the speed control loop.

According to a second embodiment as set forth in the first embodiment, the spindle reversed operation detector unit detects the reversed operation of the spindle if a real moving amount of the spindle or the spindle motor as monitored in a predetermined control period is not zero and has a sign different from that of the real moving amount of the last time.

According to a third embodiment as set forth in the first or the second embodiment, a predetermined value is added to the reverse correction amount over a predetermined period of time.

According to a fourth embodiment as set forth in the first or the second embodiment, an initial value of the reverse correction amount is calculated based upon a torque instruction of just before the reversed operation of the feed axis motor or upon the integrator, the reverse correction amount decreasing depending upon the torque instruction after the reversed operation of the feed axis motor, upon the integrator of the speed loop, or upon the moving distance of the feed axis motor.

According to a fifth embodiment as set forth in the first or the second embodiment, the reverse correction amount varies in proportion to a synchronization error between the spindle and the feed axis motor.

The above objects, features and advantages as well as other objects, features and advantages of the invention will become further obvious from the following detailed description of representative embodiments of the invention shown in the accompanying drawings.

BRIEF DESCRIPTION OF THE DRAWINGS

FIG. 5 is a diagram of time chart of the speed of a spindle, speed of a feed axis and reverse correction amount;

FIG. 9 is a time chart of the synchronization error and of the reverse correction amount;

DETAILED DESCRIPTION

Figure 1:
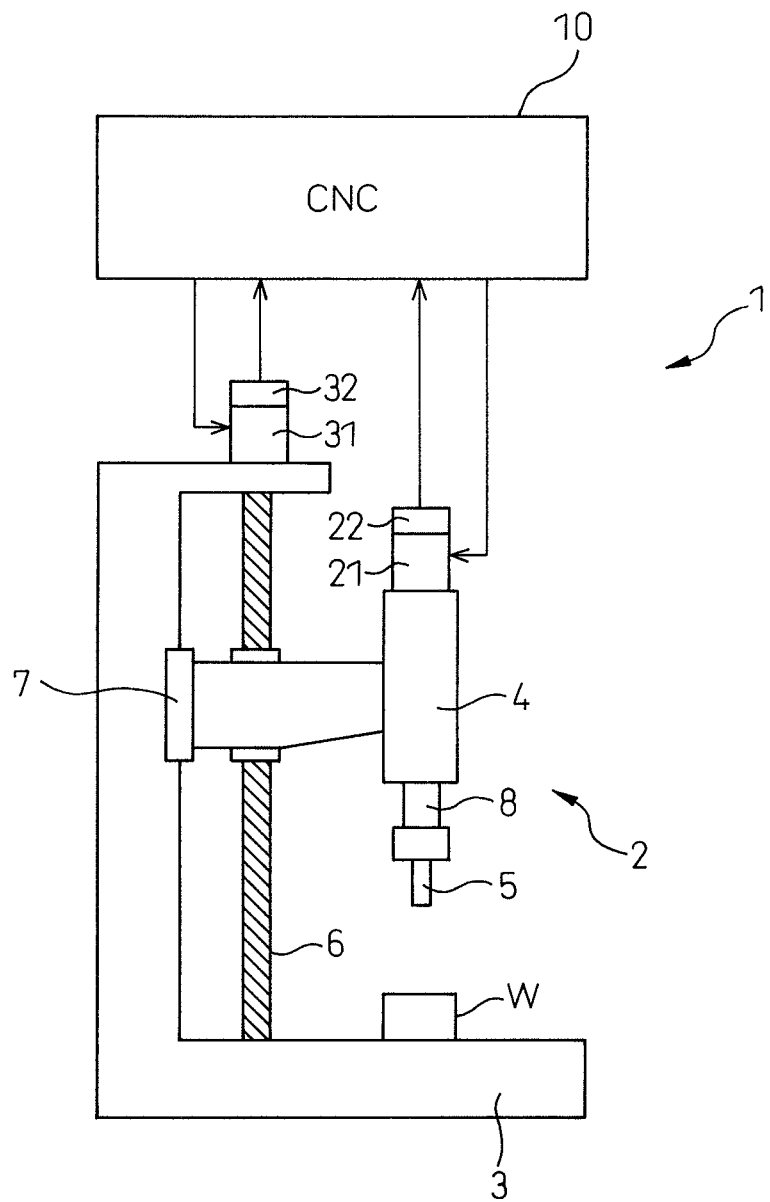
FIG. 1 is a schematic view of a tapping machine based on the present invention.

Embodiments of the invention will now be described with reference to the accompanying drawings in which the same members are denoted by the same reference numerals. For easy comprehension, the drawings are on arbitrary scales.

FIG. 1 is a schematic view of a tapping machine based on the present invention. As shown in FIG. 1, the tapping machine 1 is constituted chiefly by a tapping unit 2 and a CNC 10 for controlling the operation of the tapping unit 2.

The tapping unit 2 includes a base 3 equipped with a ball screw 6 by which a slider 7 moves up and down. A spindle head 4 is coupled to the slider 7, the spindle head 4 having a tapping tool 5 attached to an end thereof. As shown, a spindle motor 21 is arranged on the top surface of the spindle head 4, and the tapping tool 5 rotates about a spindle 8 due to the spindle motor 21.

Similarly, a feed axis motor 31 is coupled to the ball screw 6. If the ball screw 6 is driven by the feed axis motor 31, then the slider 7 is fed in the up-and-down direction together with the spindle head 4 along the ball screw 6. The spindle motor 21 and the feed axis motor 31 are operated according to the coordinate systems that have been managed for them.

Further, an encoder 22 is attached to the spindle motor 21 to detect the rotational angle of the spindle 8 of the spindle motor 21 for every predetermined control period. Similarly, an encoder 32 attached to the feed axis motor 31 detects the feed position of the spindle head 4 on the ball screw 6 for every predetermined control period based on the rotation of the output shaft of the feed axis motor 31. Therefore, the encoders 22 and 32 play the roles of a rotational angle detector unit and a feed position detector unit, respectively. As can be seen from FIG. 1, values detected by the encoders 22 and 32 are fed to the CNC 10.

Figure 2:
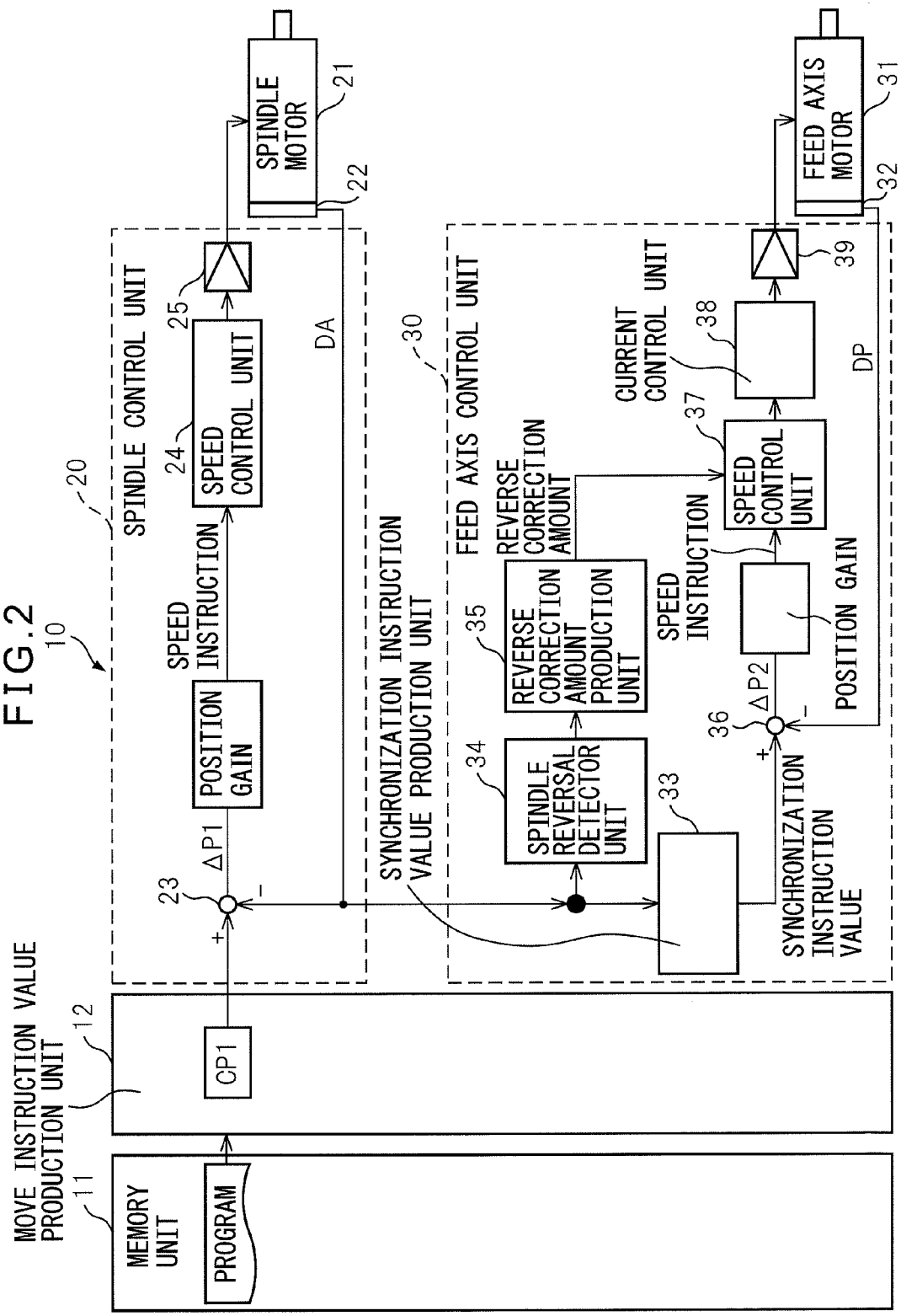
FIG. 2 is a functional block diagram of the tapping machine shown in FIG. 1.

FIG. 2 is a functional block diagram of the tapping machine shown in FIG. 1. The CNC 10 is a digital computer and, as shown in FIG. 2, includes chiefly a memory unit 11, a move instruction production unit 12 for producing a move instruction value CP1 for the spindle motor 21, a spindle control unit 20 for controlling the spindle motor 21, and a feed axis control unit 30 for controlling the feed axis motor 31.

The memory unit 11 is a combination of ROM and RAM. The ROM in the memory unit 11 is storing a screw pitch STP of the tapping tool 5 in addition to an operation program of the tapping unit 2. The screw pitch STP stands for a distance from a screw thread to a neighboring screw thread. Further, the RAM in the memory unit 11 temporarily stores various data for producing an instruction value.

As shown in FIG. 2, the spindle control unit 20 includes a first position deviation production unit 23 for producing a first position deviation $\Delta P1$ by subtracting the rotational angle value DA detected by the encoder 22 from the move instruction value CP1 for the spindle motor 21 produced by the position instruction production unit 12, and a speed control unit 24 which multiplies the first position deviation $\Delta P1$ by a position gain to produce a speed instruction and, further, outputs a torque instruction depending upon the speed instruction. The thus produced torque instruction is output to the spindle motor 21 through a servo amplifier 25 so that the spindle motor 21 is operated.

Further, the feed axis control unit 30 includes a synchronization instruction value production unit 33 for producing a synchronization instruction value for the feed axis based on the detected rotational angle value DA and the screw pitch STP, and a spindle reversal detector unit 34 for detecting the reversed operation of the spindle motor 21 or the spindle 8. In the invention, the feed axis operates following the reversed operation of the spindle 8. Further, the feed axis control unit 30 includes a reverse correction amount production unit 35 for producing a reverse correction amount for improving the follow-up performance of reversed operation of the feed axis.

Further, the feed axis control unit 30 includes a second position deviation production unit 36 for producing a second position deviation $\Delta P2$ by subtracting the feed position value DP detected by the encoder 32 from the synchronization instruction value produced by the synchronization instruction value production unit 33, a speed control unit 37 which multiplies the second position deviation $\Delta P2$ by a position gain to produce a speed instruction and, further, produces a torque instruction for the feed axis motor 31 depending upon the speed instruction, and a current control unit 38 for controlling the electric current flowing into the feed axis motor 31 depending on the torque instruction. The current control unit 38 controls the feed axis motor 31 through a servo amplifier 39.

Figure 3:
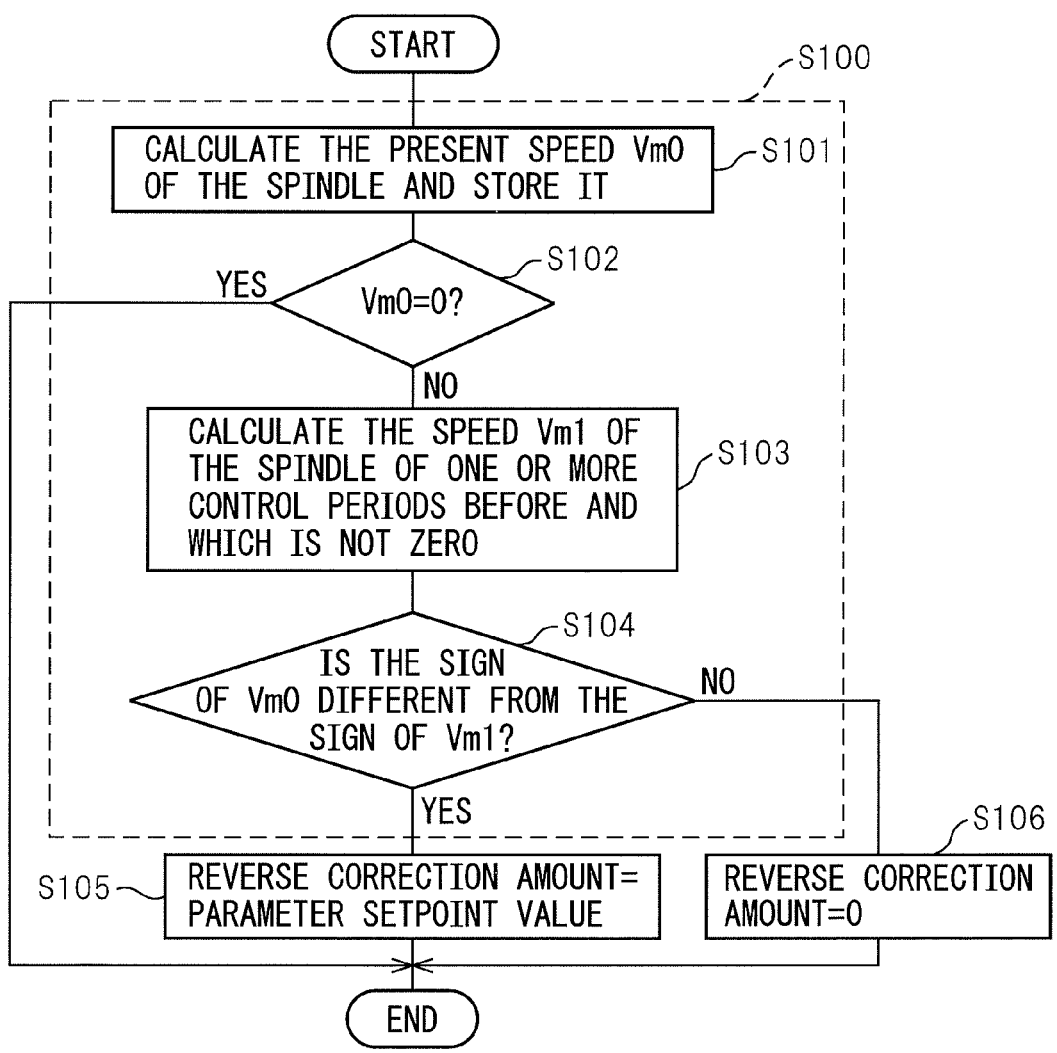
FIG. 3 is a flowchart illustrating the operation of the tapping machine based on the present invention.

FIG. 3 is a flowchart illustrating the operation of the tapping machine based on the present invention. The operation of the tapping machine will now be described with reference to FIG. 3.

First, at step S100 in FIG. 3, it is judged if the spindle 8 has reversely operated. The reversed operation is detected by the spindle reversal detector unit 34 shown in FIG. 2. Hereinafter, detection of the reversed operation will be concretely described. However, the reversed operation may be detected by a method different from that of FIG. 3.

The encoder 22 detects the rotational angle of the spindle motor 21 or the spindle 8 for every predetermined control period. At step S101, the speed Vm0 of the spindle motor 21 or the spindle 8 is calculated being furnished with a sign based on the detected rotational angle values DA which are successively fed to the spindle reversal detector unit 34. A plurality of the latest rotational angle values DA detected in a predetermined control period can be used. The calculated speed Vm0 is stored in the memory unit 11.

Then, at step S102, it is judged if the speed Vm0 is zero. If the speed Vm0 is zero, the spindle motor 21 or the spindle 8 is not reversely operating and, therefore, the routine ends.

On the contrary, if the speed Vm0 is not zero, the routine proceeds to step S103. The step S103 calculates the speed Vm1 (≠0) of the spindle motor 21 or the spindle 8 of one or more control periods before the speed Vm0. Calculating the speed Vm1 is roughly the same as calculating the speed Vm0, and is not described here again in detail.

At step S104, it is judged if the sign has changed between the speed Vm0 and the speed Vm1. If the sign has changed, it is decided that the spindle motor 21 or the spindle 8 has reversely operated, and the routine proceeds to step S105. Therefore, it will be learned that in the present invention, the reversed operation of the spindle 8 is easily and correctly detected.

If the sign has not been changed, it is decided that the spindle motor 21 or the spindle 8 is not reversely operating, and the reverse correction amount is set to zero at step S106. On the contrary, at step S105, the parameter setpoint value produced by the reverse correction amount production unit 35 is set as a reverse correction amount. Reverting to FIG. 2, the reverse correction amount produced by the reverse correction amount production unit 35 is fed to the speed control unit 37.

Figure 4A:
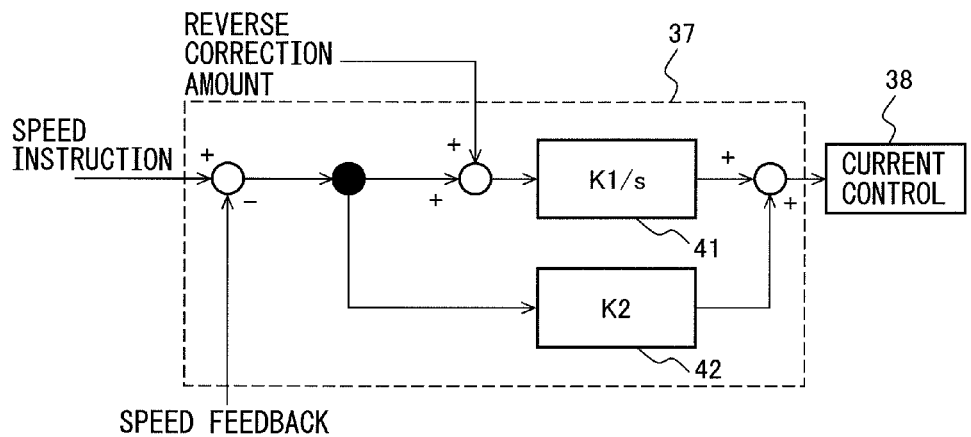
FIG. 4A is a first enlarged view showing a speed control unit on an enlarged scale.

FIG. 4A is a first enlarged view showing the speed control unit on an enlarged scale. As shown in FIG. 4A, the speed control unit 37 includes an integrator 41 and a gain multiplier unit 42. In FIG. 4A, the reverse correction amount is fed to the integrator 41 only.

Figure 4B:
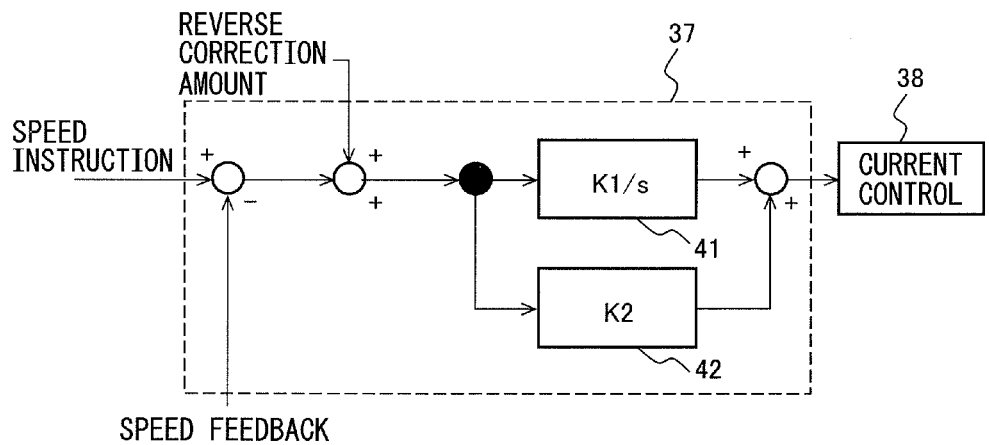
FIG. 4B is a second enlarged view showing the speed control unit on an enlarged scale.

On the contrary, in FIG. 4B which is a second enlarged view showing the speed control unit on an enlarged scale, the reverse correction amount is fed to both the integrator 41 and the gain multiplier unit 42. In the case of FIG. 4B, it will be learned that the effect of the reverse correction amount is quickly reflected on the torque instruction through the gain multiplier unit 42.

FIG. 5 is a diagram of time chart of the speed of the spindle, speed of the feed axis and reverse correction amount. As can be seen from FIG. 5, at a moment t1, the speed of the spindle become a minus speed from zero, and the spindle reversal detector unit 34 judges that the operation is reversed at the moment t1. A reverse correction amount Y1 produced by the reverse correction amount production unit 35 has a predetermined magnitude as shown in FIG. 5, and is fed to the speed control unit 37 over a predetermined duration. The predetermined duration may be, for example, equal to a predetermined control period.

Alternatively, as shown in the lower part of FIG. 5, the reverse correction amount production unit 35 may produce a reverse correction amount Y2 in a manner that the magnitude thereof decreases from its initial value with the passage of time. As will be described later with reference to FIG. 9, it is preferable that the reverse correction amount Y2 decreases depending upon a synchronization error between the spindle motor 21 and the feed axis motor 31. In FIG. 5, the reverse correction amount Y2 is decreasing monotonously from its initial value. However, the reverse correction amount Y2, may be decreased exponentially.

Figure 6:
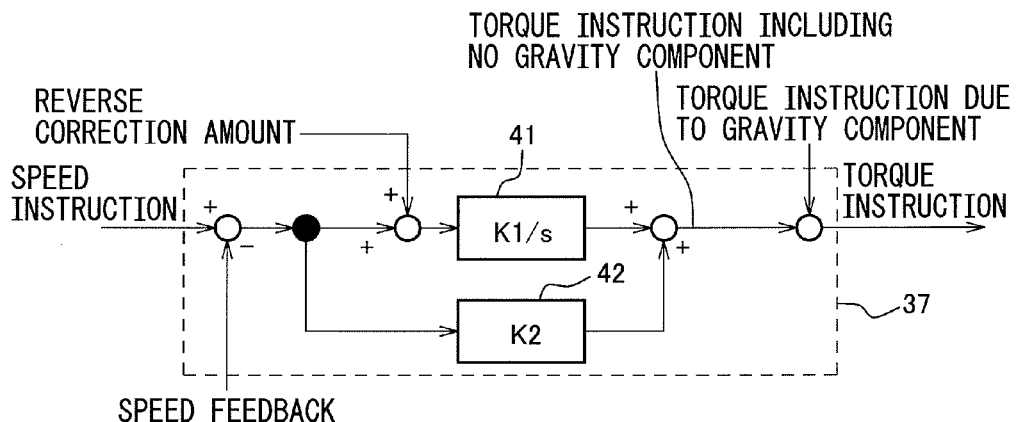
FIG. 6 is a third enlarged view showing the speed control unit on an enlarged scale.

FIG. 6 is a third enlarged view showing the speed control unit on an enlarged scale. As shown in FIG. 6, if the speed instruction obtained by multiplying the first position deviation ΔP1 by the position gain is input to the speed control unit 37, the reverse correction amount is added thereto, and the resulting speed instruction passes through the integrator 41. Further, in FIG. 6, the speed instruction passes through the gain multiplier 42, too, and is added to the output from the integrator 41. Thus, there is produced a torque instruction (predetermined value) which includes no gravity component of the feed axis motor 31. Then, as shown in FIG. 6, a torque instruction due to the gravity component of the feed axis motor 31 is added thereto to produce a torque instruction T.

Figure 7:
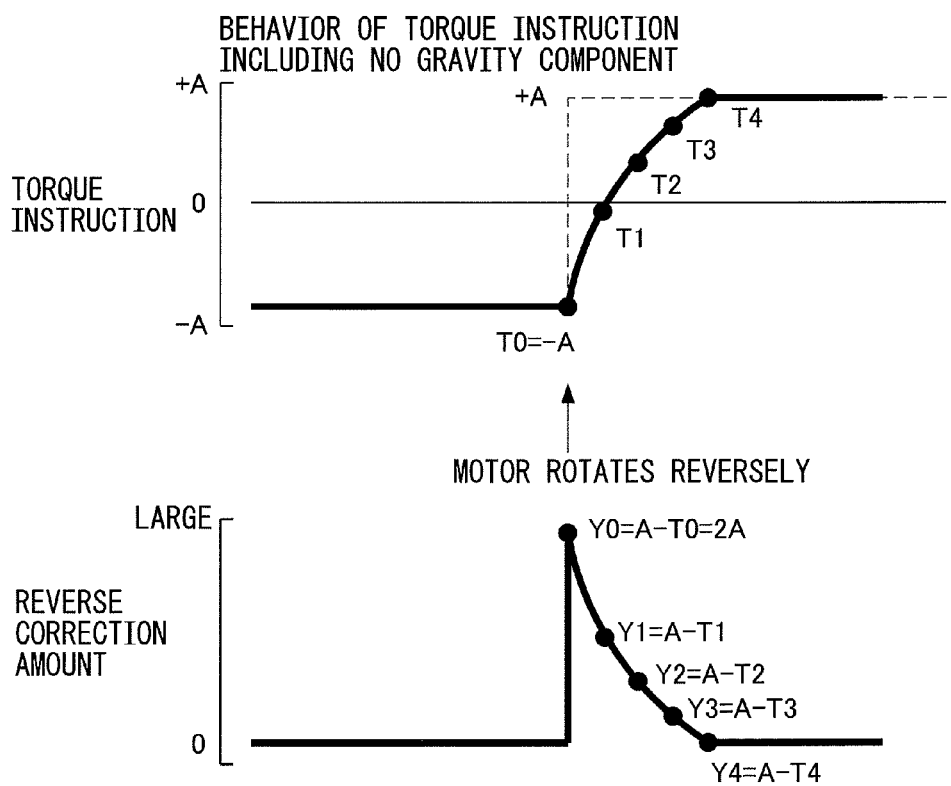
FIG. 7 is a time chart of the torque instruction including no gravity component and of the reverse correction amount.

FIG. 7 is a time chart of the torque instruction including no gravity component and of the reverse correction amount. If the torque instruction T0 just before the reversed operation is presumed to be −A, the target torque instruction after the reversed operation is A. In this connection, the torque instruction T per a unit time, e.g., per a predetermined control period is denoted by Tn, and the reverse correction amount is denoted by Yn (n is a natural number). Then the reverse correction amount production unit 35 calculates a reverse correction amount Yn in compliance with the following formula (1), $$Yn = A - Tn \quad (1)$$

In this case, the reverse correction amount decreases with an increase in the torque.

Though not diagramed, at the time when the feed axis motor 31 is reversed, the integrator 41 behaves nearly similarly to the torque instruction T. Therefore, the reverse correction amount may be decreased depending on the behavior of the integrator 41 according to the same method as the one described above.

Figure 8:
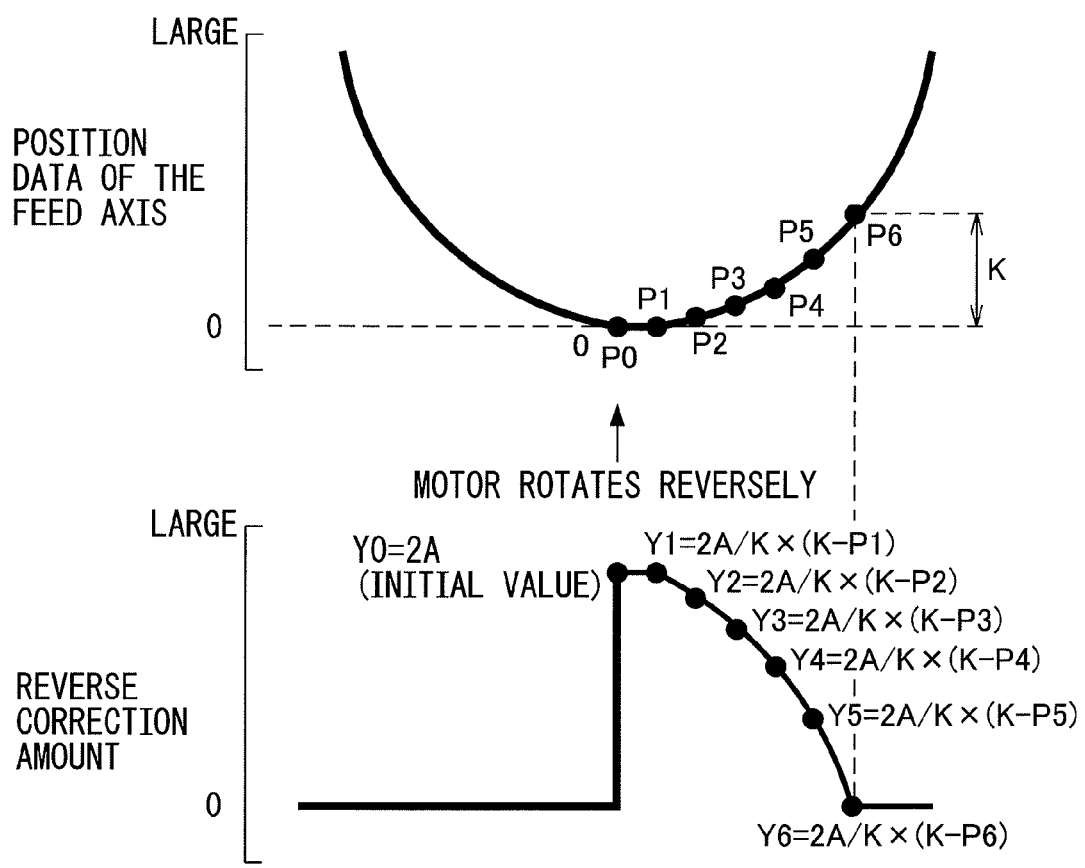
FIG. 8 is a time chart of the position data of the feed axis and of the reverse correction amount.

FIG. 8 is a time chart of the position data of the feed axis and of the reverse correction amount. At the time when the operation is reversed, the position data of the feed axis changes as shown in FIG. 8. As described above, the torque instruction T changes as shown in FIG. 7. If the torque instruction T0 just before the reversed operation is presumed to be −A, the target torque after the operation is reversed is A and, therefore, the initial value of the reverse correction amount becomes 2A.

In this connection, the position data of the feed axis per a unit time, e.g., per a predetermined control period is denoted by Pn and the reverse correction amount is denoted by Yn (n is a natural number). Then, as shown in FIG. 8, the position data of the feed axis is denoted by K at which the reverse correction amount is not added any more. In this case, the reverse correction amount production unit 35 calculates a reverse correction amount Yn in compliance with the following formula (2), $$Yn = 2A/K \times (K - Pn) \quad (2)$$

In this case, the reverse correction amount decreases depending upon the position data of the feed axis.

FIG. 9 is a time chart of the synchronization error and of the reverse correction amount. In FIG. 9, the reverse correction amount is given to vary in proportion to the synchronization error. If the synchronization error per a unit time, e.g., per a predetermined control period is denoted by En and the reverse correction amount is denoted by Yn (n is a natural number), then the reverse correction amount production unit 35 calculates a reverse correction amount Yn in compliance with the following formula (3), $$Yn = C \times En \quad (3)$$

where C is a proportional constant.

In this case, the reverse correction amount decreases depending upon the amount of the synchronization error. It will be learned that the accuracy of response of the feed axis can be further increased if the reverse correction amount Yn per a unit time is changed as described above.

Figure 10A:
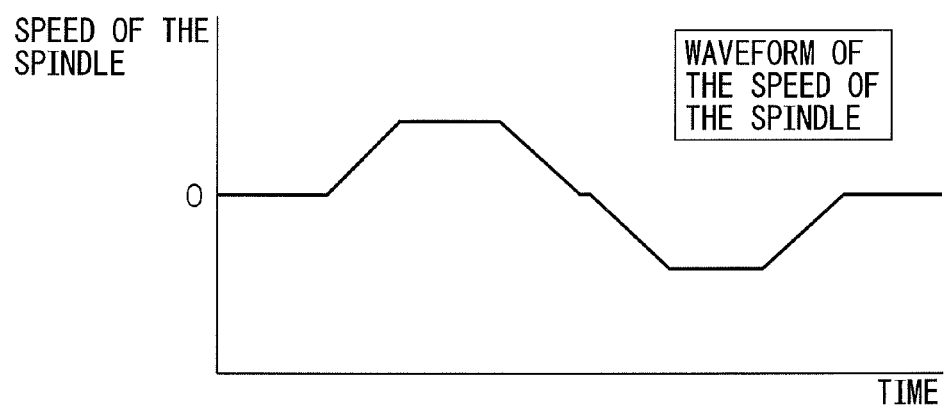
FIG. 10A is a diagram showing a relationship between the speed of the spindle and the time in the invention.
Figure 10B:
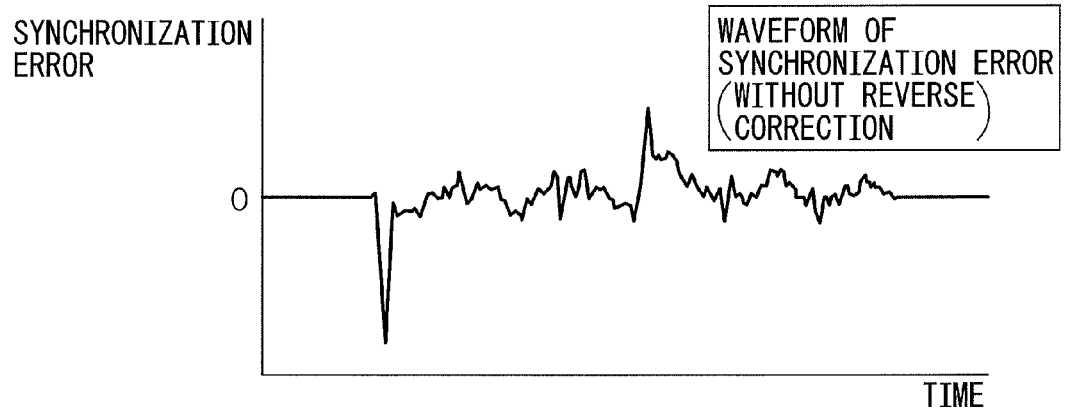
FIG. 10B is a diagram showing a relationship between the synchronization error and the time when there is no reverse correction.
Figure 10C:
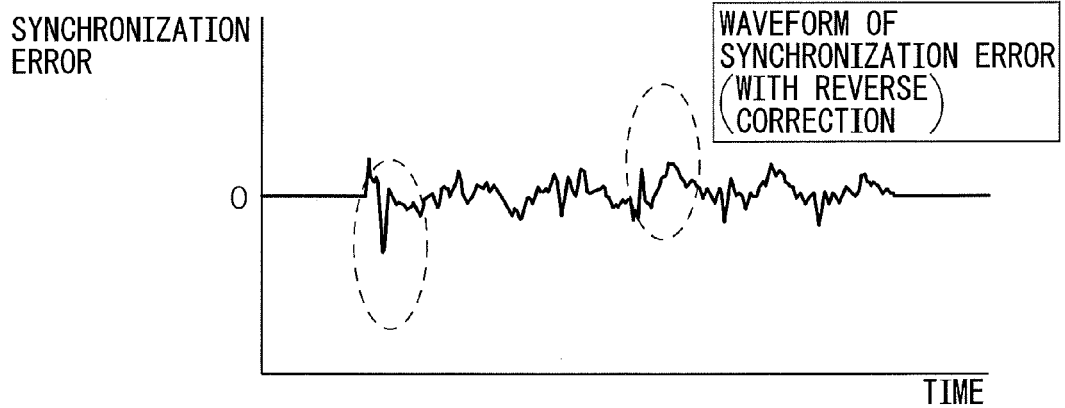
FIG. 10C is a diagram showing a relationship between the synchronization error and the time when there is a reverse correction.

FIG. 10A is a diagram showing a relationship between the speed of the spindle and the time in the invention, FIG. 10B is a diagram showing a relationship between the synchronization error and the time when there is no reverse correction, and FIG. 10C is a diagram showing a relationship between the synchronization error and the time when there is a reverse correction. As can be seen from the comparison of FIG. 10A with FIG. 10B, when the spindle is in operation, the synchronization error is continuously generated. Specifically, the synchronization error increases when the speed of the spindle changes into a positive value from zero and when the speed of the spindle changes into a negative value from zero.

In the invention as described above, the reverse correction amount is added to the speed control unit 37 of the feed axis control unit 30. Therefore, as can be seen from FIGS. 10A and 10C, the synchronization error is considerably decreased when the speed of the spindle changes into a positive value from zero and when the speed of the spindle changes into a negative value from zero. In other words, upon introducing the reverse correction amount as in the present invention, the reversed operation of the feed axis motor 31 is quickened at a moment when the spindle is reversely operated, and the synchronization error considerably decreases. As a result according to the present invention, it can be seen that the accuracy of response of the feed axis is heightened even when it is not allowed to set the gain of the feed axis to a so large value.

Effects Of The Invention

According to the first embodiment, in case the reversed operation of the spindle is detected, the reverse correction amount is added to the speed instruction on the speed control loop of the feed axis control unit or to the integrator of the speed control loop. This quickens the reversed operation of the feed axis motor, whereby the synchronization error decreases and the accuracy of response of the feed axis is increased.

According to the second embodiment, the reversed operation of the spindle can be easily and correctly detected.

According to the third to fifth embodiments, the accuracy of response of the feed axis can be further increased.

Although the invention was described above by way of typical embodiments thereof, it will be understood that people skilled in the art will be able to effect the above-mentioned changes and various other changes, omissions and additions without departing from the scope of the invention.

The invention claimed is:

1. A tapping machine comprising:
a spindle motor for rotating a tapping tool about a spindle;
a rotational angle detector unit for detecting the rotational angle of said spindle motor or the spindle;
a feed axis motor for driving a feed axis to which said tapping tool is attached;
a position detector unit for detecting the position of said feed axis motor or said feed axis;
a move instruction value production unit for producing a move instruction value for said spindle motor;
a spindle control unit for driving said spindle motor based on a position deviation between said move instruction value produced by said move instruction value production unit and the rotational angle detected by said rotational angle detector unit;
a feed axis synchronization instruction value production unit for producing a move instruction value for the feed axis based on said detected rotational angle and a screw pitch of said tapping tool; and
a feed axis control unit for driving said feed axis motor based on a position deviation between said move instruction value produced by said feed axis synchronization instruction value production unit and the position value detected by said position detector unit, to thereby execute the tapping operation by operating said spindle motor and said feed axis motor in synchronization;
said tapping machine, further, comprising:
a spindle reversal detector unit for detecting the reversed operation of said spindle during the tapping operation; and
a reverse correction amount production unit for producing a reverse correction amount for improving follow-up performance of reversed operation of said feed axis at the time when the reversed operation of said spindle is detected by said spindle reversal detector unit;
wherein when the reversed operation is detected by said spindle reversal detector unit, the reverse correction amount produced by said reverse correction amount production unit is added to the speed instruction on a speed control loop of said feed axis control unit or to an integrator of said speed control loop.

2. The tapping machine as set forth in claim 1, wherein said spindle reversal detector unit detects the reversed operation of said spindle if a real moving amount of said spindle or said spindle motor as monitored in a predetermined control period is not zero and has a sign different from that of the real moving amount of the last time.

3. The tapping machine as set forth in claim 2, wherein a predetermined value is added to said reverse correction amount over a predetermined period of time.

4. The tapping machine as set forth in claim 2, wherein an initial value of said reverse correction amount is calculated based upon a torque instruction of just before the reversed operation of said feed axis motor or upon said integrator, said reverse correction amount decreasing depending upon the torque instruction after the reversed operation of said feed axis motor, upon the integrator of the speed loop, or upon the moving distance of said feed axis motor.

5. The tapping machine as set forth in claim 2, wherein said reverse correction amount varies in proportion to a synchronization error between the spindle and the feed axis motor.

6. The tapping machine as set forth in claim 1, wherein a predetermined value is added to said reverse correction amount over a predetermined period of time.

7. The tapping machine as set forth in claim 1, wherein an initial value of said reverse correction amount is calculated based upon a torque instruction of just before the reversed operation of said feed axis motor or upon said integrator, said reverse correction amount decreasing depending upon the torque instruction after the reversed operation of said feed axis motor, upon the integrator of the speed loop, or upon the moving distance of said feed axis motor.

8. The tapping machine as set forth in claim 1, wherein said reverse correction amount varies in proportion to a synchronization error between the spindle and the feed axis motor.

* * * * *